(12) United States Patent
Yellapragada et al.

(10) Patent No.: US 10,339,373 B1
(45) Date of Patent: Jul. 2, 2019

(54) OPTICAL CHARACTER RECOGNITION UTILIZING HASHED TEMPLATES

(71) Applicant: INTUIT INC., Mountain View, CA (US)

(72) Inventors: Vijay S. Yellapragada, Mountain View, CA (US); Peijun Chiang, Mountain View, CA (US); Sreeneel K. Maddika, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/112,499

(22) Filed: Aug. 24, 2018

Related U.S. Application Data

(63) Continuation of application No. 15/221,971, filed on Jul. 28, 2016, now Pat. No. 10,095,920.

(51) Int. Cl.

| G06K 9/00 | (2006.01) |
|---|---|
| G06K 9/62 | (2006.01) |
| G06K 9/46 | (2006.01) |
| G06T 3/40 | (2006.01) |
| G06T 7/11 | (2017.01) |
| G06F 16/58 | (2019.01) |
| G06F 16/93 | (2019.01) |

(52) U.S. Cl.
CPC ......... *G06K 9/00442* (2013.01); *G06F 16/58* (2019.01); *G06F 16/93* (2019.01); *G06K 9/00483* (2013.01); *G06K 9/46* (2013.01); *G06K 9/6201* (2013.01); *G06T 3/40* (2013.01); *G06T 7/11* (2017.01); *G06K 2009/4666* (2013.01); *G06T 2207/30176* (2013.01)

(58) Field of Classification Search
None
See application file for complete search history.

(56) References Cited

U.S. PATENT DOCUMENTS

| 2005/0165747 A1 | 7/2005 | Bargeron et al. |
|---|---|---|
| 2011/0128360 A1 | 6/2011 | Hatzav et al. |
| 2015/0030241 A1 | 1/2015 | Kakkar et al. |
| 2016/0295287 A1* | 10/2016 | Jiang ................ H04N 21/41407 |

\* cited by examiner

*Primary Examiner* — Bernard Krasnic
(74) *Attorney, Agent, or Firm* — Patterson + Sheridan, LLP

(57) ABSTRACT

Techniques are disclosed for performing optical character recognition (OCR) by identifying a template based on a hash of a document. One embodiment includes a method for identifying a template associated with an image. The method includes receiving a digital image, a portion of the image depicting a first document, and extracting the portion of the image. The method further includes scaling the portion of the image and generating a first hash from the scaled image. The method further includes comparing the first hash to a set of hashes, each corresponding to a template. The method further includes selecting a first template as corresponding to the first document based on comparing the first hash to the set of hashes and extracting one or more sections of the portion of the image based on the selected first template. The method further includes performing OCR on the extracted one or more sections.

20 Claims, 7 Drawing Sheets

OPTICAL CHARACTER RECOGNITION UTILIZING HASHED TEMPLATES

CROSS-REFERENCE TO RELATED APPLICATIONS

This Application is a continuation of co-pending U.S. patent application Ser. No. 15/221,971, filed on Jul. 28, 2016, which is incorporated by reference herein in its entirety.

INTRODUCTION

Field

The present disclosure relates to techniques for extracting data from documents. More specifically, the present disclosure relates to techniques for performing optical character recognition (OCR) by identifying a template for a document based on a hash of the document.

BACKGROUND

Data processing and exchange are essential for a variety of business and personal transactions. For example, small businesses use accounting and inventory data to obtain and share reports regarding inventory sales, customer invoices, or cash flow. Similarly, healthcare providers examine medical records to view patient information related to insurance providers, medical conditions, or office visits.

In addition, data exchange frequently relies on document exchange including electronic versions of documents, such as word-processing documents, spreadsheets, or Portable Document Format (PDF) documents, and paper documents (e.g., which may be generated electronically). For example, a business may manage business transactions with a set of customers by creating a set of bills, invoices, or other types of documents containing data associated with the business transactions and sending the documents to the respective customers. The customers use the data in the documents to pay the bills or invoices, respond to the business, or update their records of the transactions. Similarly, companies, banks, and mortgage companies may provide several tax documents (e.g., W-2, 1099-Int, etc.) to employees and customers as needed to file their tax returns, for example, by using commercially available income tax preparation software.

However, variations in the layouts or designs of documents can disrupt the process of extracting data from the documents. For example, a customer may receive bills, invoices, or other semi-structured documents from a variety of businesses. While the documents may include many of the same types of data, locations of the data on a given document (e.g., a form) often vary across documents from different sources. As a result, a computing device performing optical character recognition on an electronic version of the document may have difficulty extracting information from a given document for use by other applications (e.g., a tax preparation application). Instead, the recipient or document owner may have to manually enter data from the document into an application.

SUMMARY

One embodiment presented herein includes a computer-implemented method for identifying a template associated with an image, including receiving a digital image, a portion of the image depicting a first document; extracting the portion of the image; scaling the portion of the image; generating a first hash from the scaled image; comparing the first hash to a set of hashes, each corresponding to a template; selecting a first template as corresponding to the first document based on comparing the first hash to the set of hashes; extracting one or more sections of the portion of the image based on the selected first template; and performing optical character recognition on the extracted one or more sections of the portion of the image.

Another embodiment presented herein includes a computing device for identifying a template associated with an image. The computing device includes a memory and a processor. The processor is configured to receive a digital image, a portion of the image depicting a first document; extract the portion of the image; scale the portion of the image; generate a first hash from the scaled image; compare the first hash to a set of hashes, each corresponding to a template; select a first template as corresponding to the first document based on comparing the first hash to the set of hashes; extract one or more sections of the portion of the image based on the selected first template; and perform optical character recognition on the extracted one or more sections of the portion of the image.

Another embodiment presented herein includes a non-transitory computer-readable medium comprising instructions that when executed by a processor of a computing device cause the computing device to perform a method for identifying a template associated with an image. The method includes receiving a digital image, a portion of the image depicting a first document; extracting the portion of the image; scaling the portion of the image; generating a first hash from the scaled image; comparing the first hash to a set of hashes, each corresponding to a template; selecting a first template as corresponding to the first document based on comparing the first hash to the set of hashes; extracting one or more sections of the portion of the image based on the selected first template; and performing optical character recognition on the extracted one or more sections of the portion of the image.

Another embodiment presented herein includes a computing device for identifying a template associated with an image. The computing device includes means for receiving a digital image, a portion of the image depicting a first document; means for extracting the portion of the image; means for scaling the portion of the image; means for generating a first hash from the scaled image; means for comparing the first hash to a set of hashes, each corresponding to a template; means for selecting a first template as corresponding to the first document based on comparing the first hash to the set of hashes; means for extracting one or more sections of the portion of the image based on the selected first template; and means for performing optical character recognition on the extracted one or more sections of the portion of the image.

DETAILED DESCRIPTION

Figure 1:
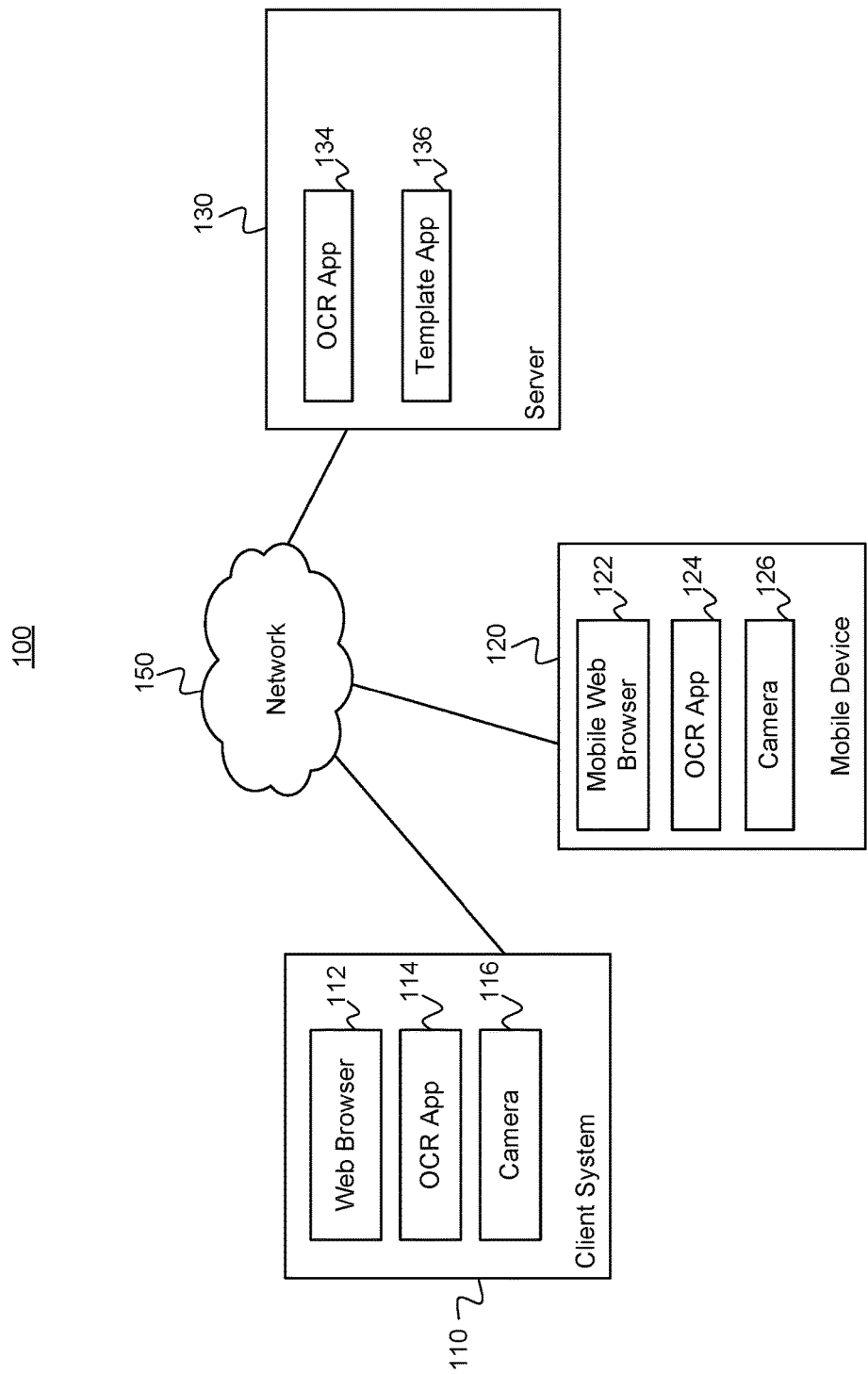
FIG. 1 illustrates an example of a computing environment used to perform OCR on a document, according to one embodiment.

Embodiments presented herein provide techniques for performing optical character recognition (OCR) by identifying a template for a document based on a hash of the document. For example, many traditional OCR techniques do not work well on structured or semi-structured documents (e.g., forms, documents arranged in a grid format, etc.), such as tax documents (e.g., W2, W4, etc.). In particular, traditional OCR techniques are often unable to distinguish between a label (e.g., the text label "NAME") in a document and the text value (e.g., the actual name of a person entered into the form) associated with the label. Embodiments presented herein provide techniques for identifying a template used for a document, determining the spatial information (e.g., size and location) of text values in the document based on the template, extracting the sections of the document corresponding to text values based on the spatial information, and performing OCR on the extracted sections of the document to extract the text values from the document.

In some cases, data may be included in a document such as a word-processing document, spreadsheet, Portable Document Format (PDF) document, web page, paper document or another type of formatted document containing semi-structured data. For example, the document may be a bill, invoice, form, statement, transcript, record, receipt, tax document (e.g., W-2, 1099-INT, 1099-DIV, consolidated brokerage statement, 1040, 1040A, 1040EZ, Schedule A, Schedule C), or other type of document that includes a specific type or set of data without adhering to a strict layout or format for showing the data.

The lack of common design, layout, or format between such documents may prevent efficient extraction or transfer of data from the documents to an application (e.g., a tax preparation application) used to process or manage the data. For example, Optical Character Recognition (OCR) engines are designed to be general purpose text-extraction systems and perform well on documents in which text is linearly laid out horizontally and vertically. OCR engines generally employ simple segmentation techniques to identify text blobs in a document. These techniques do not perform as well for structured/semi-structured documents, for example, tax documents. This may result in sub-par OCR results. Custom development of data-extraction code may be unfeasible for a large number of documents that frequently vary in design or layout. Thus, instead, users of the documents may be involved in a tedious, time-consuming, or error-prone process of manually entering data from the documents into the application before using the data with the application.

For example, existing income-tax preparation software typically collects income-tax information directly or indirectly from users. For example, a user may provide the income-tax information from forms (such as a W-2 form) by typing it in manually. Alternatively, the user may provide credential information (such as a user name and password) that allows the income-tax information to be downloaded from a payroll company's server. However, this indirect collection technique is not available for many users.

Manually providing income-tax information is a time-consuming and laborious process. Furthermore, because users don't know which data on a given form is relevant, they often provide all the information on the form, which results in wasted effort. In addition, manually provided income-tax information often contains errors that may cause mistakes in income-tax returns. However, requiring users to validate all of the data they have provided (such as all of the fields in a W-2 form) is also a time-consuming and laborious process, and the user may not detect all of the errors.

Furthermore, easy access to portable computing devices (e.g., smartphones) and plentiful network bandwidth have made portable computing devices very popular for sharing and processing data. For instance, users may easily download and execute a range of applications on their portable computing devices such as tablets and smartphones to process and share data. Factors such as larger screen sizes, increased computational capabilities, and inherent portability and convenience have made such devices the favorite computing platform of many users.

However, compact mobile devices also often have a number of limitations. Portability often comes at the expense of dedicated input mechanisms (e.g., replacing a full-size keyboard with a small virtual touch-screen keyboard), which can make data entry difficult. For example, manually inputting financial data into a smartphone can be a slow, frustrating, and error-prone process.

Embodiments of the present disclosure discuss techniques to efficiently and accurately extract data from semi-structured documents (e.g., tax forms). Further, some of the embodiments presented herein may advantageously be designed to run on resource-constrained environments, such as mobile devices, which have limited memory and processing power. In particular, some of the embodiments presented herein may utilize little memory and processing power to identify a template associated with a document, and further to identify sections of the document to OCR based on the identified template.

In some embodiments, a computing device is configured to generate a database of templates of documents. In particular, the computing device receives electronic (also referred to as "digital") images of documents. The documents may correspond to different semi-structured documents, e.g., tax forms. For example, different companies may use different templates for a W2 form. The computing device may receive electronic images of several different W2 forms. The electronic images may correspond to electronic versions of the documents, or may correspond to captured images of a physical document that are captured using an image capture device, such as a camera phone, video camera, digital camera, etc., that is connected to or implemented in the computing device, or separate from the computing device. In some embodiments, multiple images of a single document may be captured, and one of the images may be selected as the candidate image for the document. For example, a user can select a best looking image as the candidate image for the document.

In some embodiments, the computing device processes the images corresponding to different documents. For example, the computing device binarizes (e.g., utilizing NICK binarization) the images and scales (e.g., utilizing Lancosz resampling) the images. Binarizing an image refers to setting each pixel of the image to one of two values (e.g., 0 or 1), thus generating a bi-tonal image. In some embodiments, the computing device may scale the images to a very-small size (e.g., 8×8, 16×16, etc.), so that a hash generated from the scaled images is small (e.g., 64 bytes, 256 bytes, etc.) and does not require a large amount of memory for storage. Further, by utilizing scaled images and hashes, the processing power and time required for performing OCR of a document may be reduced.

In some embodiments, the computing device applies an image-hashing algorithm (e.g., geometric hashing, linear combination of pixel-values, etc.) to the processed images to generate a hash of each of the processed images. The generated hash is stored (e.g., in a database of templates) along with spatial information of the corresponding document as a template for the document. For example, the document may be a semi-structured document (e.g., form) with one or more text boxes where text values can be entered. The computing device may extract the spatial information (e.g., size and location of a rectangle) of where the text values can be entered in each document and store that information (e.g., as metadata) along with the generated hash for the document in the database of templates. In some embodiments, the extraction of the spatial information may be performed manually, semi-automatically, or automatically (e.g., borders associated with text boxes are identified using image recognition techniques). In some embodiments, labels indicating the type of data the text values represent may also be stored along with the generated hash as part of the template. The database of templates can then be used to identify a template used for a document, determine the spatial information (e.g., size and location) of text values in the document based on the template, extract the sections of the document corresponding to text values based on the spatial information, and perform OCR on the extracted sections of the document.

In some embodiments, a computing device receives an electronic image of a document and generates a hash based on the image of the document as discussed with respect to the generation of the database of templates. The computing device then compares the generated hash to the hashes stored in the database of templates. The computing device then selects the template with the matching (e.g., exact match, closest match, etc.) hash as the template corresponding to the document. The computing device then extracts, from the electronic image, sections of the document corresponding to the spatial information of text values associated with the template. The computing device performs OCR on each of the extracted sections of the document. The computing device may further associate the text recognized in the extracted sections with the labels associated with the extracted sections.

In some embodiments, if the hash of the document does not match a hash stored in the database of templates, the computing device may itself, or send the image of the document to another computing device to, utilize the image of the document to generate a template corresponding to the document as discussed.

Different aspects of these techniques are described in more detail herein, along with additional examples of how the techniques may be used to perform OCR by identifying a template for a document based on a hash of the document.

FIG. 1 illustrates an example of a computing environment 100 used to perform OCR on a document, according to one embodiment. As shown, the computing environment 100 includes client system 110, a mobile device 120, and a server 130, which are each connected to a network 150. The network 150, in general, may be a wide area network (WAN), local area network (LAN), wireless LAN (WLAN), personal area network (PAN), a cellular network, etc. In a particular embodiment, the network 150 is the Internet.

Client system 110 is included to be representative of a general purpose computing system, such as a desktop or laptop computer hosting software applications that may be installed and run locally, or may be used to access applications running on the server 130. For example, client system 110 includes web browser 112 used to access the server 130 by rendering web pages (e.g., generated by the OCR app 134) from or running applications (e.g., OCR app 134) on the server 130. Similarly, client system 110 includes an OCR app 114. The OCR app 114 may be a local application that is installed and run locally on the client system 110. In another embodiment, the OCR app 114 may be representative of a component of a client server application (or other distributed application) which can communicate with the server 130 over network 150. For example, OCR app 114 may be a "thin" client where the processing is largely directed by the OCR app 114, but performed by computing systems of the server 130 or a conventional software application installed on client system 110. The client system 110 may further include a camera 116 for capturing images.

Mobile device 120 is included to be representative of a variety of computing devices, such as a mobile telephone or computing tablet. As shown, the mobile device 120 may access the server 130 over network 150 using a mobile web browser 122 or local application or "app" (e.g., OCR app 124) executed on the mobile device 120. In another embodiment, the OCR app 124 may be a local application that is installed and run locally on the mobile device 120. The mobile device 120 may further include a camera 126 (e.g., front-facing camera, rear facing camera, etc.) for capturing images.

As shown, the server 130 includes an OCR app 134 that may run locally on the server 130. Further, the OCR app 134 may be accessed and executed by devices on the network 150, such as the client system 110 or the mobile device 120. The OCR app 134, for example, may generate web pages that are rendered by a browser such as browser 112 or 122. In another example, OCR app 134 may be accessed by or work along with client side applications, such as OCR app 114 or 124, as discussed. The server 130 also includes a template app 136. The template app 136 may run locally on the server 130.

In some embodiments, the template app 136 is used to generate a database of templates based on the techniques discussed herein. For example, the template app 136 may be used to receive an electronic image corresponding to a document, process (e.g., binarize, scale, etc.) the image, generate a hash of the processed image, extract spatial information of text values in the document, and store the generated hash and spatial information of text values as a template corresponding to the document.

Further, the OCR app 114, OCR app 124, and/or OCR app 134 may be used to identify a template used for a document, determine the spatial information (e.g., size and location) of text values in the document based on the template, extract the sections of the document corresponding to text values based on the spatial information, and perform OCR on the extracted sections of the document based on the techniques discussed herein.

In some embodiments, the OCR app 114/124/134 may receive an image of the document as an electronic version of the document or capture an image of the document, such as using an image captured by the camera 116 or 126. The same OCR app 114/124/134 that received the image of the document may generate a hash corresponding to the document. In some embodiments, the same OCR app 114/124/134 that generated the hash may then identify a template used for the document. In some other embodiments, one OCR app (e.g., OCR app 124) may generate the hash and send the hash to another OCR app (e.g., OCR app 134), which identifies the template used for the document and sends the template information back to the OCR app (e.g., OCR app 124).

Figure 2:
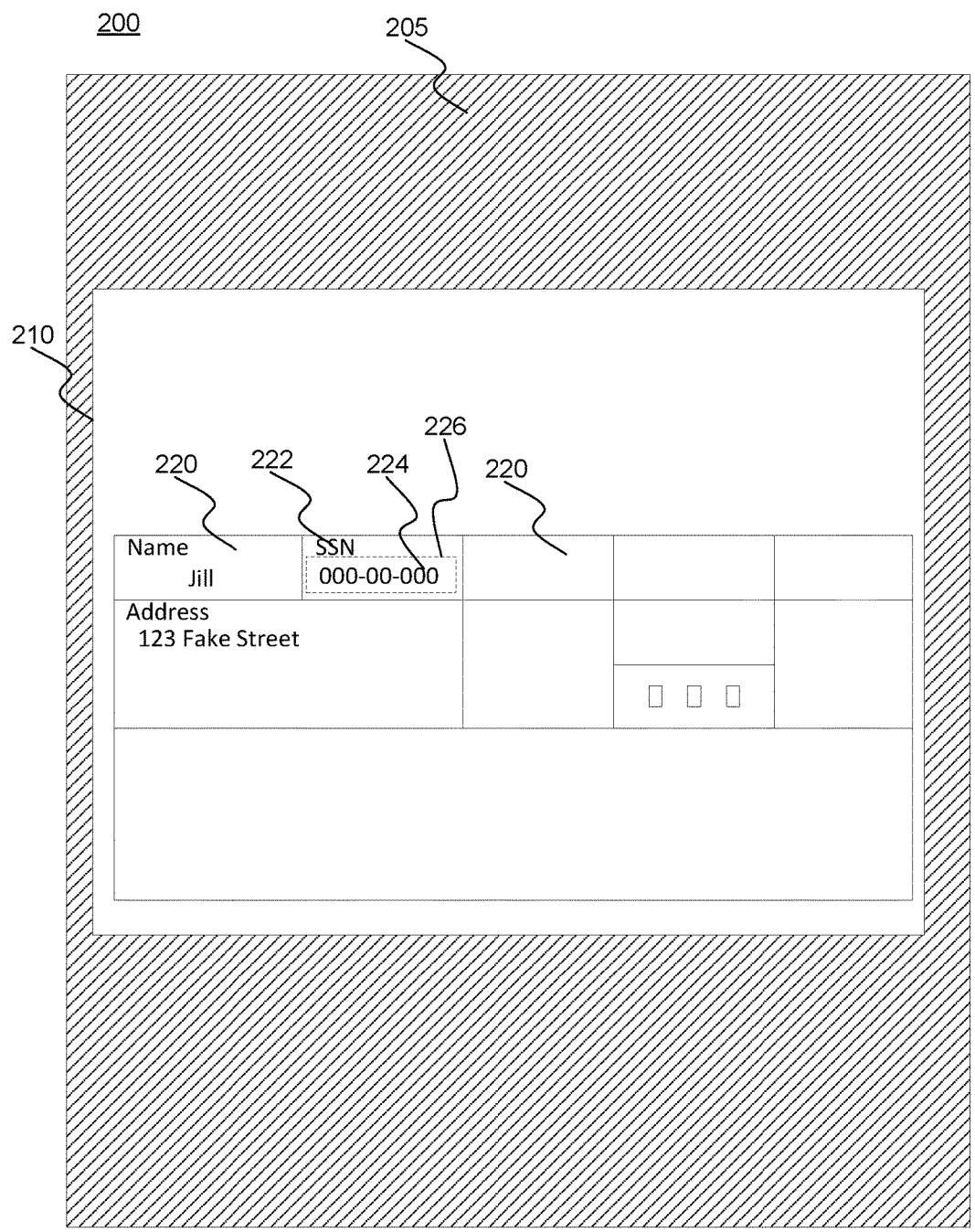
FIG. 2 illustrates an example image including a document, according to one embodiment.

FIG. 2 illustrates an example image 200 including a document 210, according to one embodiment. In the embodiment shown, the electronic image 200 includes the document 210 in a portion of the electronic image 200, as well as other background imagery 205. For example, the electronic image 200, as shown, may correspond to an image of the document 210 captured using an image capture device and include the background imagery 205. However, in some other embodiments, the electronic image 200 may not include any background imagery 205 (e.g., the electronic image 200 corresponds to an electronic version of a document).

The document 210, as shown, may be a form (e.g., tax form such as a W2). The document 210 includes a number of elements 220 (e.g., grid elements, boxes, rectangles, etc.). The elements 220 may correspond to areas on the document 210 where textual information may be found. For example, an element 220 may include a label 222 (e.g., text label), which may indicate the type of data (e.g., social security number (SSN)) that is within the element 220. The element 220 may further include a value 224 (e.g., text), which may be the actual value of the textual information (e.g., SSN) included in the element. The value 224 may be found within a section 226 (e.g., a text entry area) within the element 220 designated as the location for the value 224. Embodiments herein may provide techniques to identify such sections 226 within a document 210 based on matching the document 210 to a template, and performing OCR on such identified sections 226.

Figure 3:
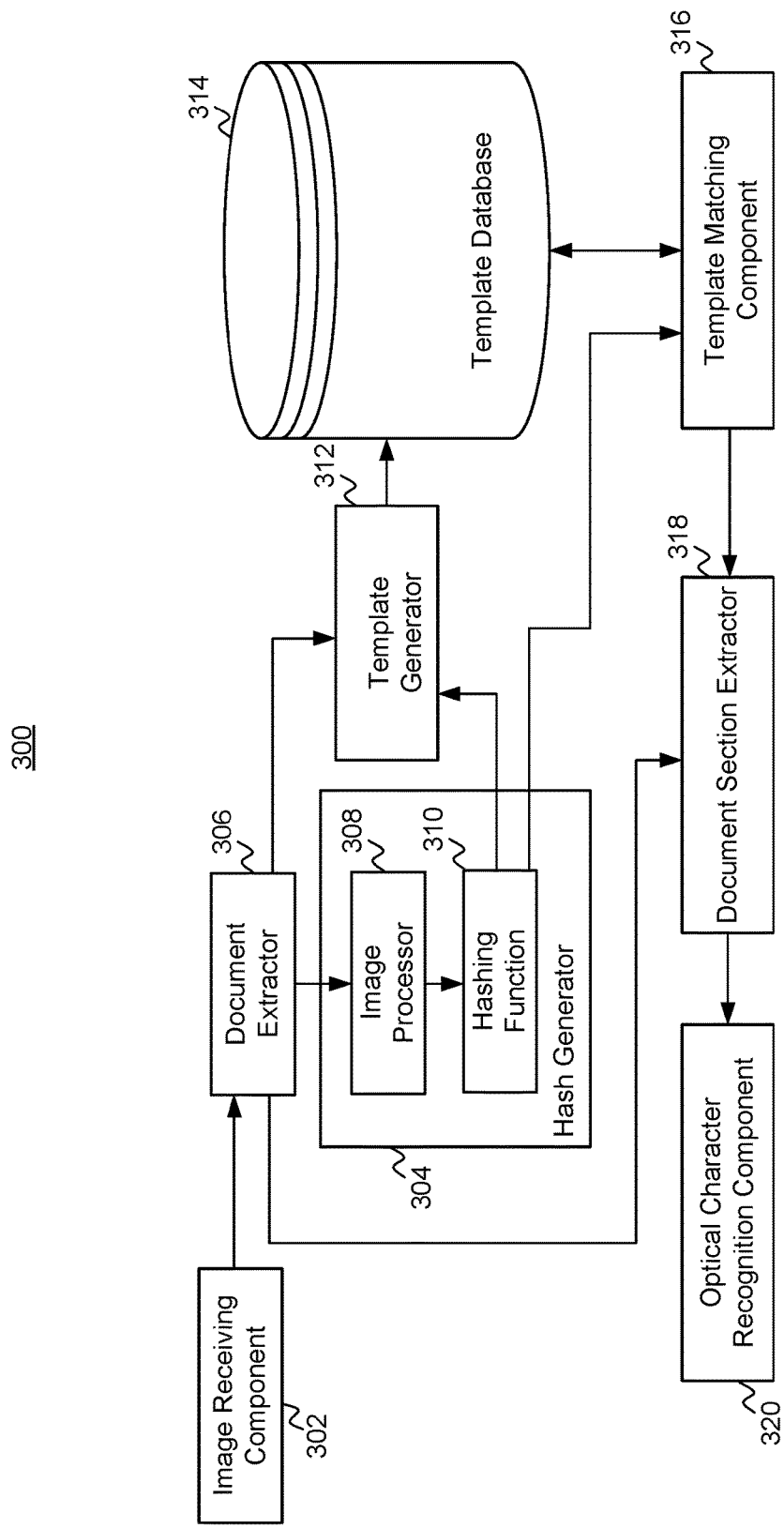
FIG. 3 illustrates components of a computing system for performing optical character recognition (OCR) by identifying a template for a document based on a hash of the document.

FIG. 3 illustrates components of a computing system 300 for performing optical character recognition (OCR) by identifying a template for a document based on a hash of the document. Each component may be hardware, software, or a combination thereof. Each component may be a single software/hardware component, or may be distributed as multiple software/hardware components. Further, multiple components may be embodied as a single software/hardware component.

For generating a template for a document, the image receiving component 302 receives an image, such as image 200, including a document, such as document 210. For example, the image receiving component 302 may receive the image as an electronic version of a document, or from an image capture device such a video camera, digital camera, etc. The image receiving component 302 passes the image 200 to the document extractor 306. The document extractor 306 extracts (e.g., crops away the background imagery 205) the portion of the image 200 that includes the document 210, as needed. For example, the document extractor 306 may perform image recognition techniques (e.g., edge finding techniques, etc.) to identify and extract the portion of the image 200 that corresponds to the document 210.

The document extractor 306 passes the image of the document 210 to the hash generator 304. The image processor 308 of the hash generator 304 processes the image. For example, the image processor 308 binarizes and scales the image of the document 210. In some embodiments, the image processor 308 also removes any values 224 in sections 226 of the document 210. The values 224 may be removed manually or automatically. Further, the image processor 308 passes the processed image to the hashing function 310. The hashing function 310 applies an image-hashing algorithm (e.g., geometric hashing, linear combination of pixel-values, etc.) to the processed image to generate a hash of the processed image. Accordingly, the hash corresponds to the document 210. The hashing function 310 passes the hash corresponding to the document 210 to the template generator 312.

The template generator 312 receives the image of the document 210 from the document extractor 306 and further the hash corresponding to the document 210 from the hashing function 310. The template generator 312 further identifies any sections 226 (sections with the values of textual information to extract from the document 210) in the document 210. For example, the sections 226 may be identified by the template generator 312 manually by a user, semi-automatically, or automatically (e.g., borders associated with text boxes are identified using image recognition techniques). In some embodiments, any values 224 in the sections 226 may be removed before identifying the sections 226. The template generator 312 further extracts the spatial information (e.g., location and size) of such sections 226 (e.g., manually by a user, semi-automatically, or automatically (e.g., borders associated with text boxes are identified using image recognition techniques)). In some embodiments, the template generator 312 also may extract information regarding the label 222 for each section 226. The label 222 information may be utilized to identify the type of data in each section 226. The template generator 312 may store the hash of the document 210, the spatial information of sections 226 of the document 210, and optionally label 222 information for the sections 226 as a template corresponding to the document 210 in the template database 314. Accordingly, the computing system 300 may generate templates for documents to be used for performing OCR on other documents.

For performing OCR by identifying a template for a document based on a hash of the document, the image receiving component 302, similarly, receives an image, such as image 200, including a document, such as document 210. The document extractor 306 and hash generator 310, further extract the portion of the image 200 that includes the document 210 and generate a hash corresponding to the document, as discussed above.

The template matching component 316 receives the hash corresponding to the document 210 from the hashing function 310. The template matching component 316 further compares the hash corresponding to the document 210 to the hashes associated with templates in the template database 314. In particular, the template matching component 316 selects the template with the hash matching (e.g., exact match, closest match, etc.) that of the hash corresponding to the document 210. The selected template is used as the template for image of the document 210.

The template matching component 316 passes the selected template for the image of the document 210 to the document section extractor 318, which further receives the image of the document 210 from the document extractor 306. The document section extractor 318 utilizes the template for the image of the document 210 to identify and extract corresponding sections 226 in the image of the document 210. In particular, the template includes spatial information for sections 226, and the document section extractor 318 extracts (e.g., crops) the portions of the image of the document 210 corresponding to sections 226 based on the spatial information (e.g., as separate images). The document section extractor 318 passes the information of the sections 226 to the optical character recognition component 320, which performs OCR on the sections 226 to identify the values 224 in the document 210. The OCR component 320 may further identify the values 224 as corresponding to the labels 222, based on the template for the image of the document 210. Accordingly, the computing system 300 may extract values using OCR techniques from documents. For example, the OCR component may extract the value "000-00-000" as corresponding to an "SSN" in the document 210.

Figure 4:
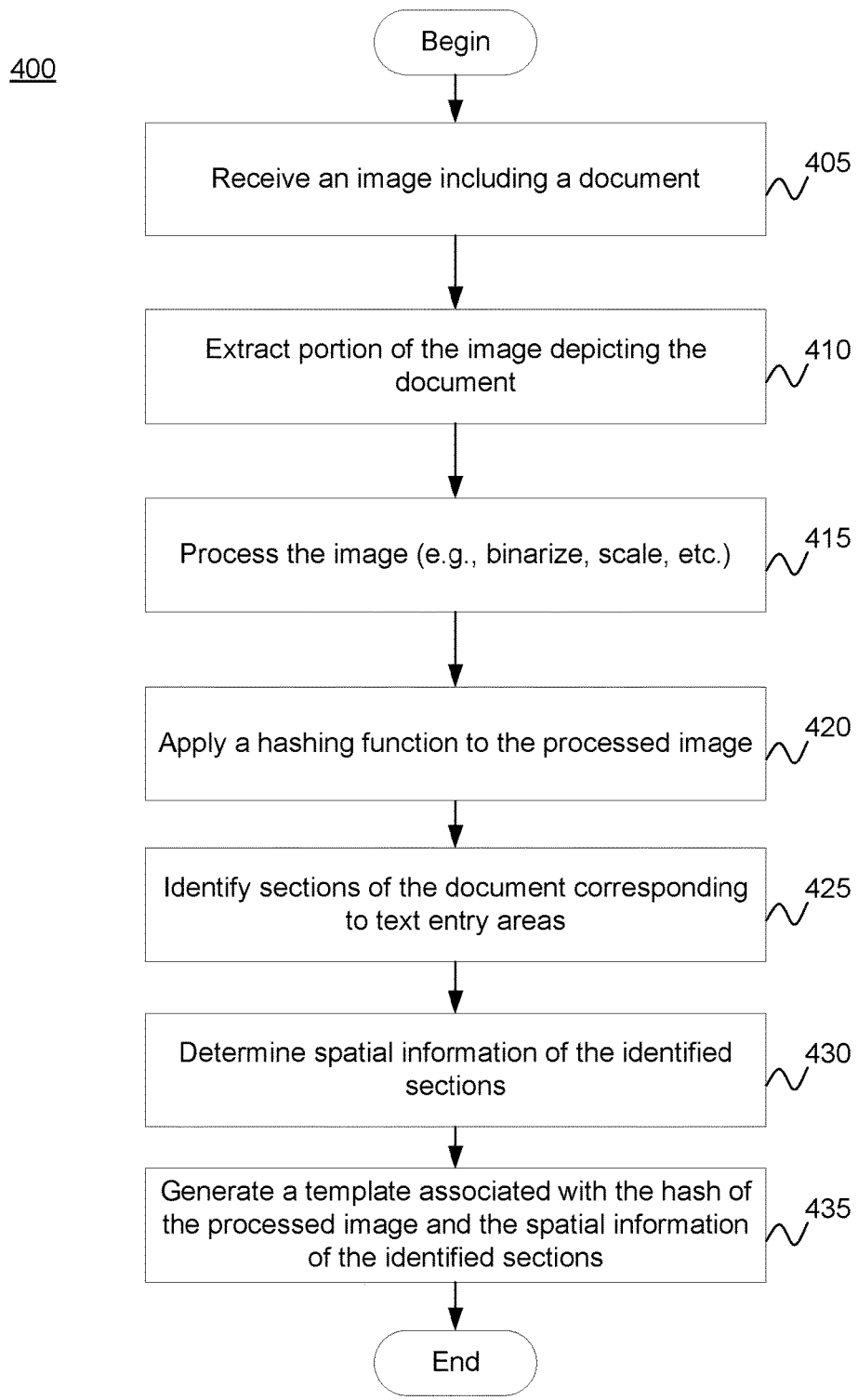
FIG. 4 illustrates a method for generating templates corresponding to documents, according to one embodiment.

FIG. 4 illustrates a method 400 for generating templates corresponding to documents, according to one embodiment. At 405, an electronic image of a document is received. For example, the electronic image may correspond to an electronic version of the document, or an image of the document captured by an image capture device. The image of the document may be received by a computing device.

At 410, the portion of the image depicting the document is extracted. For example, the image in addition to the document, may include portions depicting background imagery. The background imagery may be cropped from the image, leaving only the portion of the image depicting the document. The portion of the image depicting the document may be extracted by a computing device.

At 415, the portion of the image depicting the document is processed (e.g., binarized, scaled, etc.). For example, a computing device may binarize and scale the image of the document. Further, at 420, a hashing function is applied to the processed image. For example, a computing device may apply an image-hashing algorithm (e.g., geometric hashing, linear combination of pixel-values, etc.) to the processed image to generate a hash of the processed image.

At 425, the sections of the document corresponding to text entry areas are identified. For example, the sections may be identified manually by a user, semi-automatically, or automatically (e.g., borders associated with text boxes are identified using image recognition techniques) using a computing device. At 430, the spatial information (e.g., location and size) of the identified sections is determined. For example, the computing device may be used to manually by a user, semi-automatically, or automatically (e.g., borders associated with text boxes are identified using image recognition techniques) determine such spatial information for each of the identified sections.

At 435, a template is generated for the document. The template may include the hash of the document, spatial information for identified sections of the document, and optionally data indicative of the type of data in each of the identified sections of the document. The template may be generated and stored by a computing device.

Figure 5:
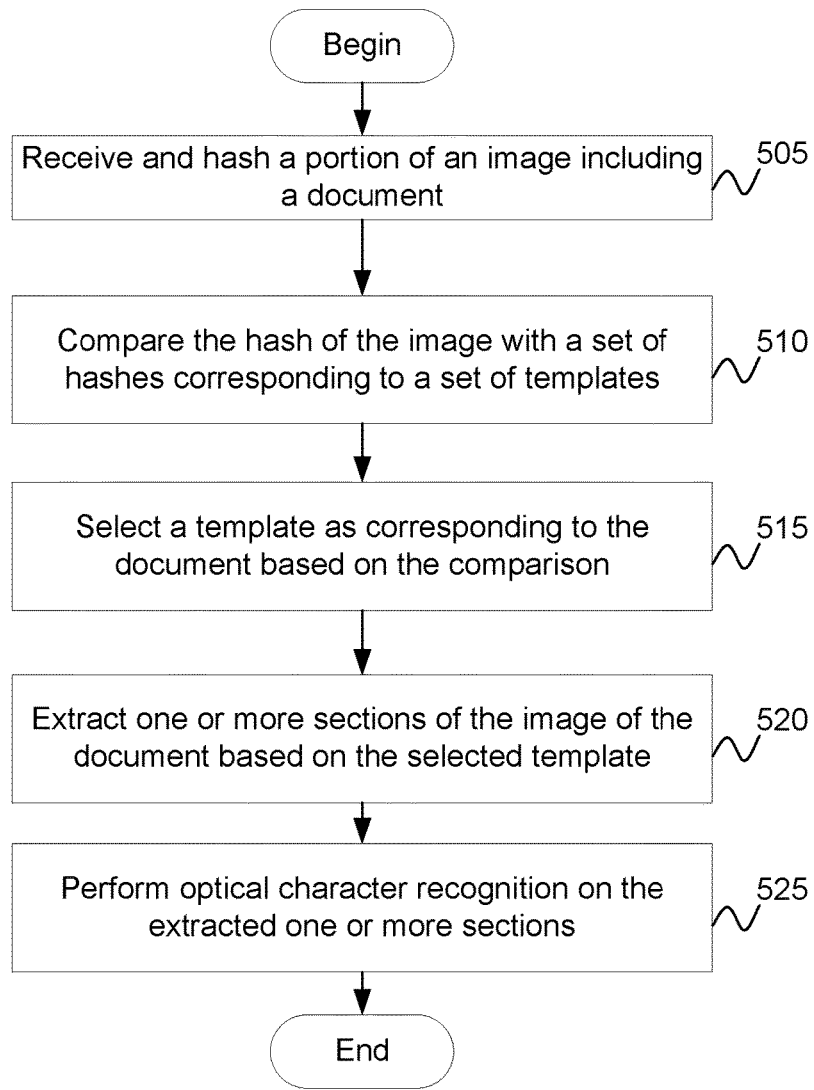
FIG. 5 illustrates a method for performing OCR by identifying a template for a document based on a hash of the document, according to one embodiment.

FIG. 5 illustrates a method 500 for performing OCR by identifying a template for a document based on a hash of the document, according to one embodiment. At 505, an image including a document is received and the portion of the image depicting the document is hashed. For example, a computing device may perform similar steps as steps 405-420 to generate a hash corresponding to the document.

At 510, the hash corresponding to the document is compared to a number of hashes corresponding to templates in a template database. At 515, a template is selected as corresponding to the document based on the comparison of the hash corresponding to the document to hashes in the template database. For example, a computing device selects the template with the hash matching (e.g., exact match, closest match, etc.) that of the hash corresponding to the document. The selected template is used as the template for image of the document.

At 520, sections of the image of the document are extracted based on the selected template for the image of the document. For example, the template includes spatial information for sections of the image of the document, and a computing device extracts (e.g., crops) the portions of the image of the document corresponding to sections based on the spatial information as separate images. At 525, OCR is performed on the images of the sections of the document. For example, a computing device performs OCR of the images of the sections of the document and associates the resulting characters with the label information for the corresponding section identified in the template.

Figure 6:
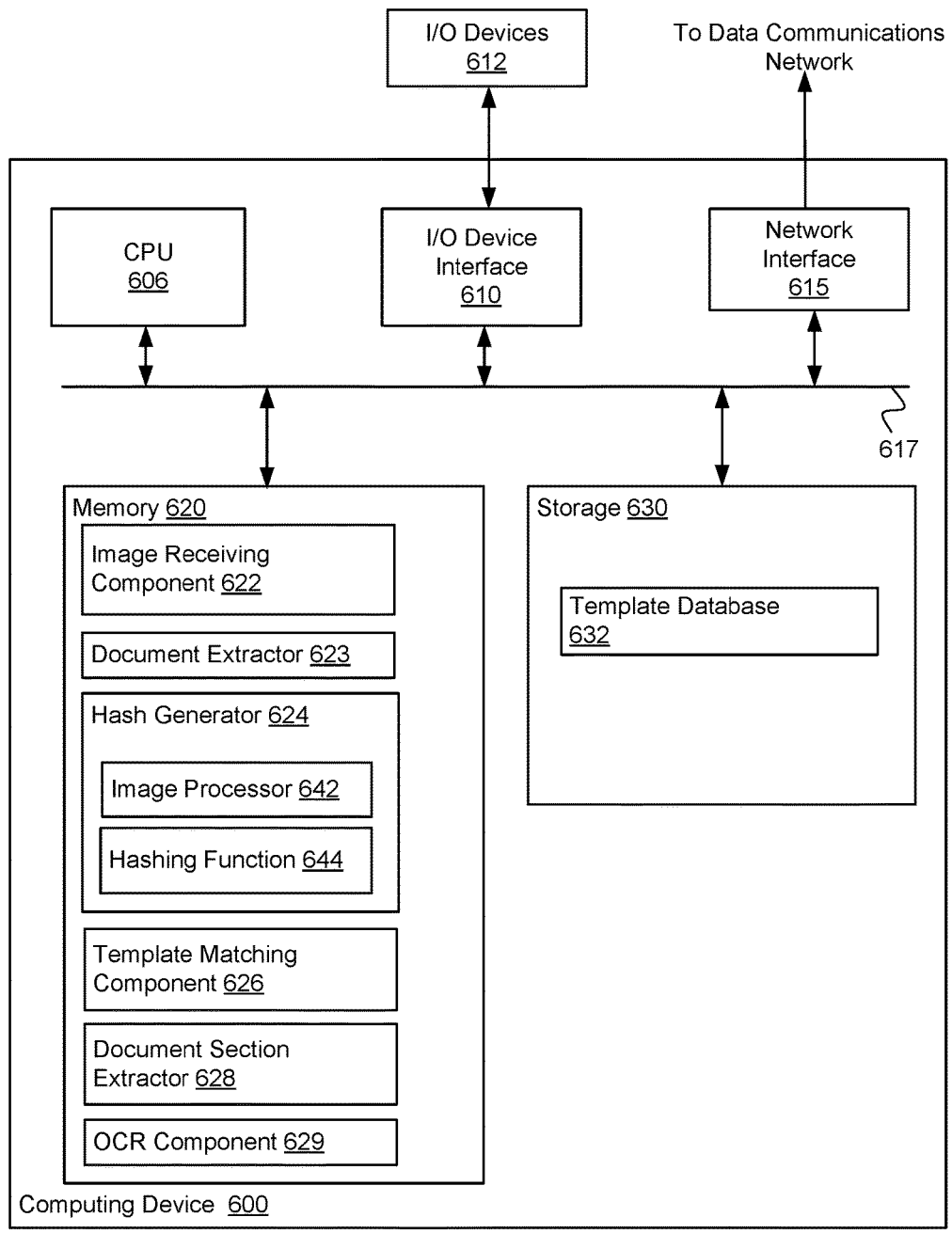
FIG. 6 illustrates an example computing system used to perform OCR by identifying a template for a document based on a hash of the document.

FIG. 6 illustrates an example computing system 600 used to perform OCR by identifying a template for a document based on a hash of the document. As shown, the computing system 600 includes, without limitation, a central processing unit (CPU) 606, a network interface 615, a memory 620, and storage 630, each connected to a bus 617. The computing system 600 may also include an I/O device interface 610 connecting I/O devices 612 (e.g., keyboard, display, mouse devices, image capture devices, etc.) to the computing system 600. Further, the computing elements shown in computing system 600 may correspond to a physical computing system (e.g., a system in a data center) or may be a virtual computing instance executing within a computing cloud.

The CPU 606 retrieves and executes programming instructions stored in the memory 620 as well as stored in the storage 630. The bus 617 is used to transmit programming instructions and application data between the CPU 606, I/O device interface 610, storage 630, network interface 615, and memory 620. Note, CPU 606 is included to be representative of a single CPU, multiple CPUs, a single CPU having multiple processing cores, and the like, and the memory 620 is generally included to be representative of a random access memory. The storage 630 may be a disk drive or flash storage device. Although shown as a single unit, the storage 630 may be a combination of fixed and/or removable storage devices, such as fixed disc drives, removable memory cards, optical storage, network attached storage (NAS), or a storage area-network (SAN).

Illustratively, the memory 620 includes an image receiving component 622, a document extractor 623, a hash generator 624, a template matching component 626, a document section extractor 628, and an OCR component 629. The storage 630 includes a template database 632. In some embodiments, these components may correspond to the components described with respect to FIG. 3.

As described, the image receiving component 622 may be configured to receive an electronic image including a document. The electronic image may be received, for example, from an image capture device via the I/O device interface 610 or another device (e.g., via the network interface 615 or I/O interface 610). The document extractor 623 may be configured to extract a portion of the image depicting the document.

Further, the hash generator 624 may be configured to generate a hash of the portion of the image depicting the document. For example, the hash generator 624 includes an image processor 642 that processes the portion of the image depicting the document, and a hashing function that 644 that generates a hash corresponding to the document.

The template matching component 626 may utilize the hash generated by the hashing function 644 and try to match the document to a corresponding template based on matching the hash to a hash in the template database 632. The template matching component 626 may receive the generated hash from a hash generator in the same system 600 that includes the template matching component 626, or another system 600 that includes a hash generator 624 (e.g., via network interface 615).

The document section extractor 628 may extract sections of the image of the document identified by the template matched to the document. Further, the OCR component 629 may perform OCR on the extracted sections of the image of the document and associate the characters for each section generated by the OCR with labels associated with the corresponding section.

Figure 7:
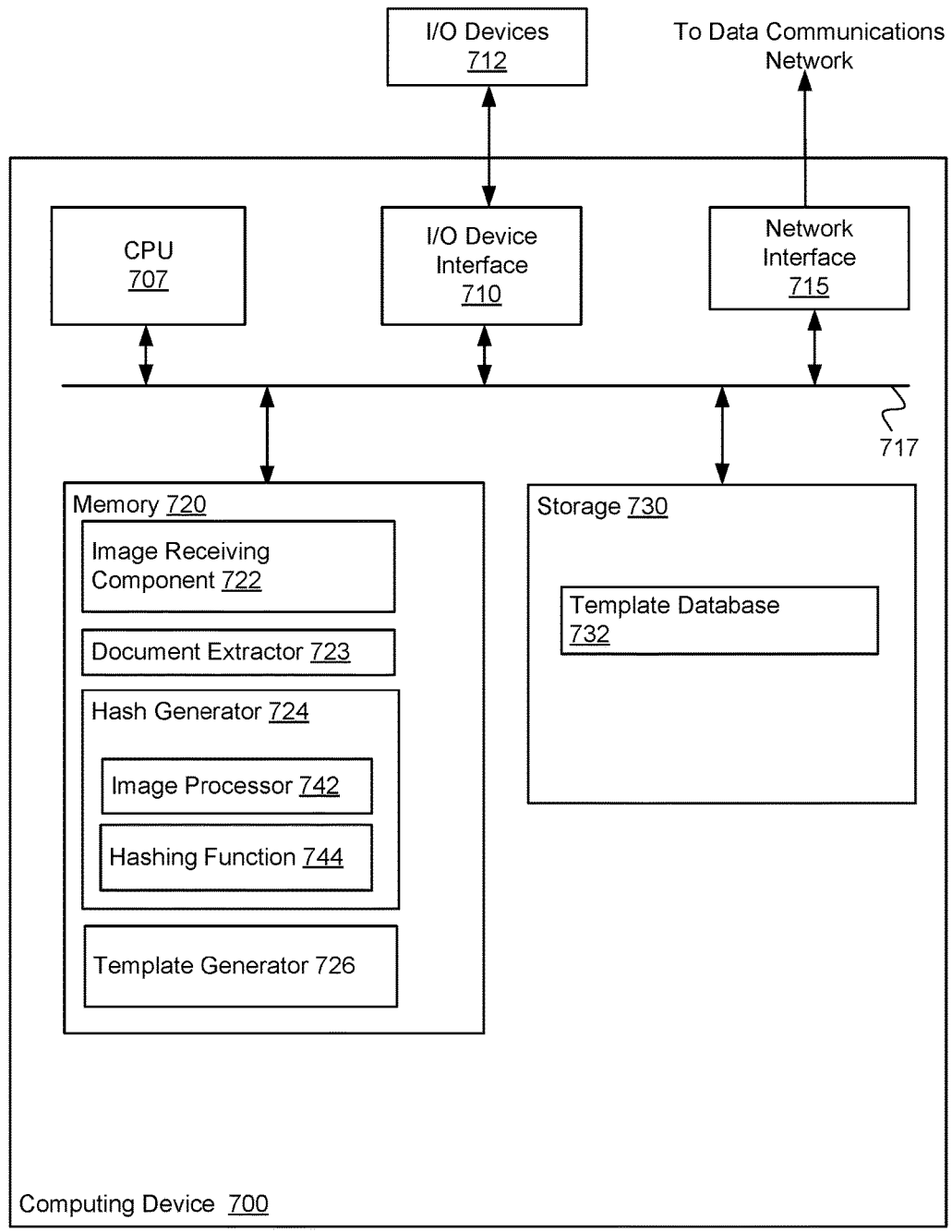
FIG. 7 illustrates an example computing system used to generate templates corresponding to documents, according to one embodiment.

FIG. 7 illustrates an example computing system 700 used to generate templates corresponding to documents, according to one embodiment. As shown, the computing system 700 includes, without limitation, a central processing unit (CPU) 707, a network interface 715, a memory 720, and storage 730, each connected to a bus 717. The computing system 700 may also include an I/O device interface 710 connecting I/O devices 712 (e.g., keyboard, display, mouse devices, image capture devices, etc.) to the computing system 700. Further, the computing elements shown in computing system 700 may correspond to a physical computing system (e.g., a system in a data center) or may be a virtual computing instance executing within a computing cloud.

The CPU 707 retrieves and executes programming instructions stored in the memory 720 as well as stored in the storage 730. The bus 717 is used to transmit programming instructions and application data between the CPU 707, I/O device interface 710, storage 730, network interface 715, and memory 720. Note, CPU 707 is included to be representative of a single CPU, multiple CPUs, a single CPU having multiple processing cores, and the like, and the memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes an image receiving component 722, a document extractor 723, a hash generator 724, and a template generator 726. The storage 730 includes a template database 732. In some embodiments, these components may correspond to the components described with respect to FIG. 3.

As described, the image receiving component 722 may be configured to receive an electronic image including a document. The electronic image may be received, for example, from an image capture device via the I/O device interface 710 or another device (e.g., via the network interface 715 or I/O interface 710). The document extractor 723 may be configured to extract a portion of the image depicting the document.

Further, the hash generator 724 may be configured to generate a hash of the portion of the image depicting the document. For example, the hash generator 724 includes an image processor 742 that processes the portion of the image depicting the document, and a hashing function that 744 that generates a hash corresponding to the document.

The template generator 726 may further determine sections corresponding to text entry locations in the portion of the image depicting the document, and store the spatial information of such sections along with the generated hash as a template corresponding to the document. The template generator 726 may further extract labels associated with each section and store them with each section as part of the template.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for creating a template associated with a document, comprising:
    receiving a first digital image including a document, the document including a plurality of bordered text sections comprising respective text values and at least one text label adjacent to one bordered text section of the plurality of bordered text sections;
    extracting a portion of the first digital image depicting the document;
    determining spatial information associated with the plurality of bordered text sections in the extracted portion of the first digital image depicting the document;
    removing the respective text values from the plurality of bordered text sections in the extracted portion of the first digital image depicting the document;
    generating a scaled image by scaling the extracted portion of the first digital image depicting the document from a first resolution to a second resolution, wherein;
        the second resolution is less than the first resolution,
        the scaled image includes the plurality of bordered text sections and the at least one text label, and
        the scaled image does not include the respective text values;
    generating a first hash based on the scaled image;
    generating a template comprising the first hash and the spatial information;
    storing the template in a database of templates;
    receiving a second hash based on a second digital image;
    comparing the second hash to a set of hashes corresponding to a set of templates in the database of templates;
    determining that the first hash matches the second hash;
    providing the template comprising the first hash to an optical character recognition component, wherein the template is configured to be used by the optical character recognition component to extract one or more sections of the second digital image.

2. The method of claim 1, further comprising: binarizing the extracted portion of the first digital image depicting the document prior to generating the first hash.

3. The method of claim 1, further comprising: determining one or more labels for one or more respective bordered text sections of the plurality of bordered text sections, wherein each label of the one or more labels indicates a type of data stored in the respective bordered text section.

4. The method of claim 3, wherein the template further comprises: the one or more determined labels.

5. The method of claim 1, further comprising: receiving a selection of the first digital image from a plurality of digital images.

6. A computing device, comprising:
    a memory comprising computer-executable instructions; and
    a processor configured to execute the computer-executable instructions and cause the computing device to perform a method for creating a template associated with a document, the method comprising:
        receiving a first digital image including a document, the document including a plurality of bordered text sections comprising respective text values and at least one text label adjacent to one bordered text section of the plurality of bordered text sections;
        extracting a portion of the first digital image depicting the document;
        determining spatial information associated with the plurality of bordered text sections in the extracted portion of the first digital image depicting the document;
        removing the respective text values from the plurality of bordered text sections in the extracted portion of the first digital image depicting the document;
        generating a scaled image by scaling the extracted portion of the first digital image depicting the document from a first resolution to a second resolution, wherein:
            the second resolution is less than the first resolution, the scaled image includes the plurality of bordered text sections and the at least one text label, and
            the scaled image does not include the respective text values;
        generating a first hash based on the scaled image;
        generating a template comprising the first hash and the spatial information;
        storing the template in a database of templates;
        receiving a second hash based on a second digital image;
        comparing the second hash to a set of hashes corresponding to a set of templates in the database of templates;
        determining that the first hash matches the second hash;
        providing the template comprising the first hash to an optical character recognition component, wherein the template is configured to be used by the optical character recognition component to extract one or more sections of the second digital image.

7. The computing device of claim 6, wherein the method further comprises: binarizing the extracted portion of the first digital image depicting the document prior to generating the first hash.

8. The computing device of claim 6, wherein the method further comprises: determining one or more labels for one or more respective bordered text sections of the plurality of bordered text sections, wherein each label of the one or more labels indicates a type of data stored in the respective bordered text section.

9. The computing device of claim 8, wherein the template further comprises: the one or more determined labels.

10. The computing device of claim 6, wherein the method further comprises: receiving a selection of the first digital image from a plurality of digital images.

11. A non-transitory computer-readable medium comprising instructions that when executed by a processor of a computing device cause the computing device to perform a method for creating a template associated with a document, the method comprising:

receiving a first digital image including a document, the document including a plurality of bordered text sections comprising respective text values and at least one text label adjacent to one bordered text section of the plurality of bordered text sections;
extracting a portion of the first digital image depicting the document;
determining spatial information associated with the plurality of bordered text sections in the extracted portion of the first digital image depicting the document;
removing the respective text values from the plurality of bordered text sections in the extracted portion of the first digital image depicting the document;
generating a scaled image by scaling the extracted portion of the first digital image depicting the document from a first resolution to a second resolution, wherein:
the second resolution is less than the first resolution,
the scaled image includes the plurality of bordered text sections and the at least one text label, and
the scaled image does not include the respective text values;
generating a first hash based on the scaled image;
generating a template comprising the first hash and the spatial information; and
storing the template in a database of templates;
receiving a second hash based on a second digital image;
comparing the second hash to a set of hashes corresponding to a set of templates in the database of templates;
determining that the first hash matches the second hash,
providing the template comprising the first hash to an optical character recognition component, wherein the template is configured to be used by the optical character recognition component to extract one or more sections of the second digital image.

12. The non-transitory computer-readable medium of claim 11, wherein the method further comprises: binarizing the extracted portion of the first digital image depicting the document prior to generating the first hash.

13. The non-transitory computer-readable medium of claim 11, wherein the method further comprises: determining one or more labels for one or more respective bordered text sections of the plurality of bordered text sections, wherein each label of the one or more labels indicates a type of data stored in the respective bordered text section.

14. The non-transitory computer-readable medium of claim 13, wherein the template further comprises: the one or more determined labels.

15. The non-transitory computer-readable medium of claim 11, wherein the method further comprises: receiving a selection of the first digital image from a plurality of digital images.

16. The method of claim 1, wherein scaling the extracted portion of the first digital image depicting the document from a first resolution to a second resolution comprises performing Lancosz resampling to the first digital image.

17. The method of claim 2, wherein binarizing the extracted portion of the first digital image depicting the document comprises performing NICK binarization.

18. The computing device of claim 6, wherein scaling the extracted portion of the first digital image depicting the document from a first resolution to a second resolution comprises performing Lancosz resampling to the first digital image.

19. The computing device of claim 7, wherein binarizing the extracted portion of the first digital image depicting the document comprises performing NICK binarization.

20. The non-transitory computer-readable medium of claim 12, wherein:
scaling the extracted portion of the first digital image depicting the document from a first resolution to a second resolution comprises performing Lancosz resampling to the first digital image, and
binarizing the extracted portion of the first digital image depicting the document comprises performing NICK binarization.

* * * * *